Figure 1:
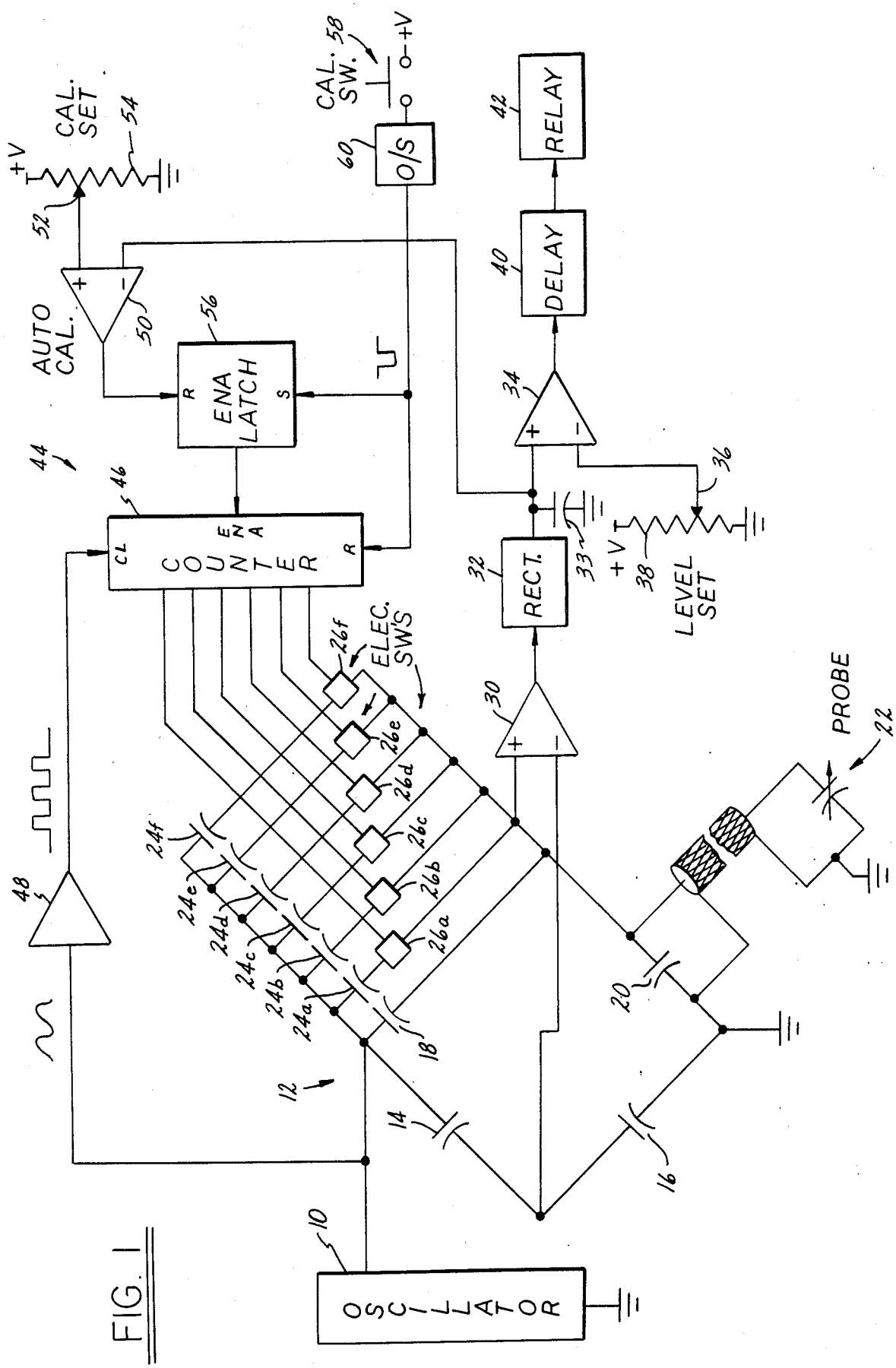

United States Patent [19]

Collins

[11] Patent Number: 4,624,139

[45] Date of Patent: Nov. 25, 1986

[54] CAPACITANCE-TYPE MATERIAL LEVEL INDICATOR

[75] Inventor: Robert C. Collins, Troy, Mich.

[73] Assignee: Berwind Corporation, Philadelphia, Pa.

[21] Appl. No.: 652,855

[22] Filed: Sep. 21, 1984

[51] Int. Cl.[4] .................... G01F 23/26; G01R 27/26
[52] U.S. Cl. ................................ 73/304 C; 324/61 R
[58] Field of Search ............. 73/1 H, 304 C; 324/130

[56] References Cited

U.S. PATENT DOCUMENTS

| | | | |
|---|---|---|---|
| 2,357,023 | 8/1944 | Reid et al. | 73/304 C |
| 2,919,401 | 12/1959 | Cole et al. | 324/74 |
| 3,339,412 | 9/1967 | Maltby | 73/304 C X |
| 3,534,606 | 10/1970 | Stamler et al. | 73/304 C |
| 3,879,644 | 4/1975 | Maltby | 73/304 C |
| 3,934,197 | 1/1976 | Pettersen et al. | 324/130 |
| 4,039,939 | 8/1977 | Wagner | 324/130 X |
| 4,063,447 | 12/1977 | Mathison | 324/130 X |
| 4,107,658 | 8/1978 | Hill et al. | 73/304 C X |
| 4,208,625 | 6/1980 | Piso | 324/61 R |
| 4,448,072 | 5/1984 | Tward | 73/304 C |
| 4,499,766 | 2/1985 | Fathauer et al. | 324/61 QL X |

Primary Examiner—Daniel M. Yasich

Attorney, Agent, or Firm—Woodcock Washburn Kurtz Mackiewicz & Norris

[57] ABSTRACT

A system for indicating level of material in a vessel as a function of material capacitance comprising a bridge circuit which includes a capacitance probe adapted to be disposed in a vessel so as to be responsive to variations in capacitance as a function of material level. An adjacent bridge arm includes a plurality of capacitors coupled to controlled electronic switches for selective connection into the bridge circuit. The bridge circuit is powered by an rf oscillator, and a differential amplifier is connected across the bridge circuit for detecting the balance condition of the bridge. An automatic calibration circuit includes a digital counter having outputs connected to the electronic switches. A comparator is responsive to the differential amplifier for enabling operation of the counter during a calibration mode of operation for selectively connecting the fixed capacitors into the bridge circuit until a preselected balance condition, corresponding to a preselected reference material level, is obtained. Thereafter, the differential amplifier is responsive to variation of probe capacitance from the reference level to indicate material level.

7 Claims, 2 Drawing Figures

CAPACITANCE-TYPE MATERIAL LEVEL INDICATOR

The present invention is directed to systems for measuring physical characteristics of materials, and more particularly to a system for indicating level of material in a storage vessel or the like as a function of material capacitance.

Use of capacitance-type detection techniques for sensing level of material in a storage vessel has been widely proposed and is reasonably well understood in the art. Likewise, it has been proposed to connect level sensing capacitance probes in one arm of a bridge-type detection circuit, such as a capacitance bridge circuit or an inductance/capacitance bridge circuit. In general, calibration of these devices in the field has been a time-consuming and laborious process requiring the efforts of a skilled or semi-skilled operator. There has been a need in the art for a system embodying facility for automatic on-demand calibration which requires little or no operator intervention.

Prior U.S. application Ser. No. 411,527, filed Aug. 25, 1982, now U.S. Pat. No. 4,499,766, entitled "Capacitance-Type Material Level Indicator" and assigned to the assignee hereof, discloses a system and probe for indicating the level of material in a vessel as a function of material capacitance. The disclosed system includes a resonant circuit having a capacitance probe adapted to be disposed in a vessel so as to be responsive to variations in capacitance as a function of material level. An rf oscillator has an output coupled to the resonant circuit and to a phase detector for detecting variations in phase angle as a function of probe capacitance. Level detection circuitry is responsive to an output of the phase detector, and to a reference signal indicative of a predetermined level of material, for indicating material level as a function of a difference between capacitance at the probe and the reference signal. In the preferred embodiments disclosed in such application, an automatic calibration circuit adjusts the resonance characteristics of the parallel resonant circuit or adjusts the reference signal indicative of a predetermined reference material level.

The automatic calibration feature has enjoyed substantial commercial acceptance and success in the material level control market in the environment of resonant circuit technology as disclosed in the referenced application. It is an object of the present invention to provide an automatic calibration technique for use in bridge-type measurement circuits, particularly capacitance-type material level measurement circuits. More specifically, and in furtherance of the foregoing, it is an object of the present invention to provide a bridge-type capacitance material level control system wherein the balance characteristics of the bridge circuit, which includes a capacitance-type material level probe, are automatically adjusted during a calibration mode of operation to a condition indicative of a preselected reference material level, and wherein the system is adapted during normal operation to respond to variations in material level with reference to such preselected calibrated reference level.

Figure 2:
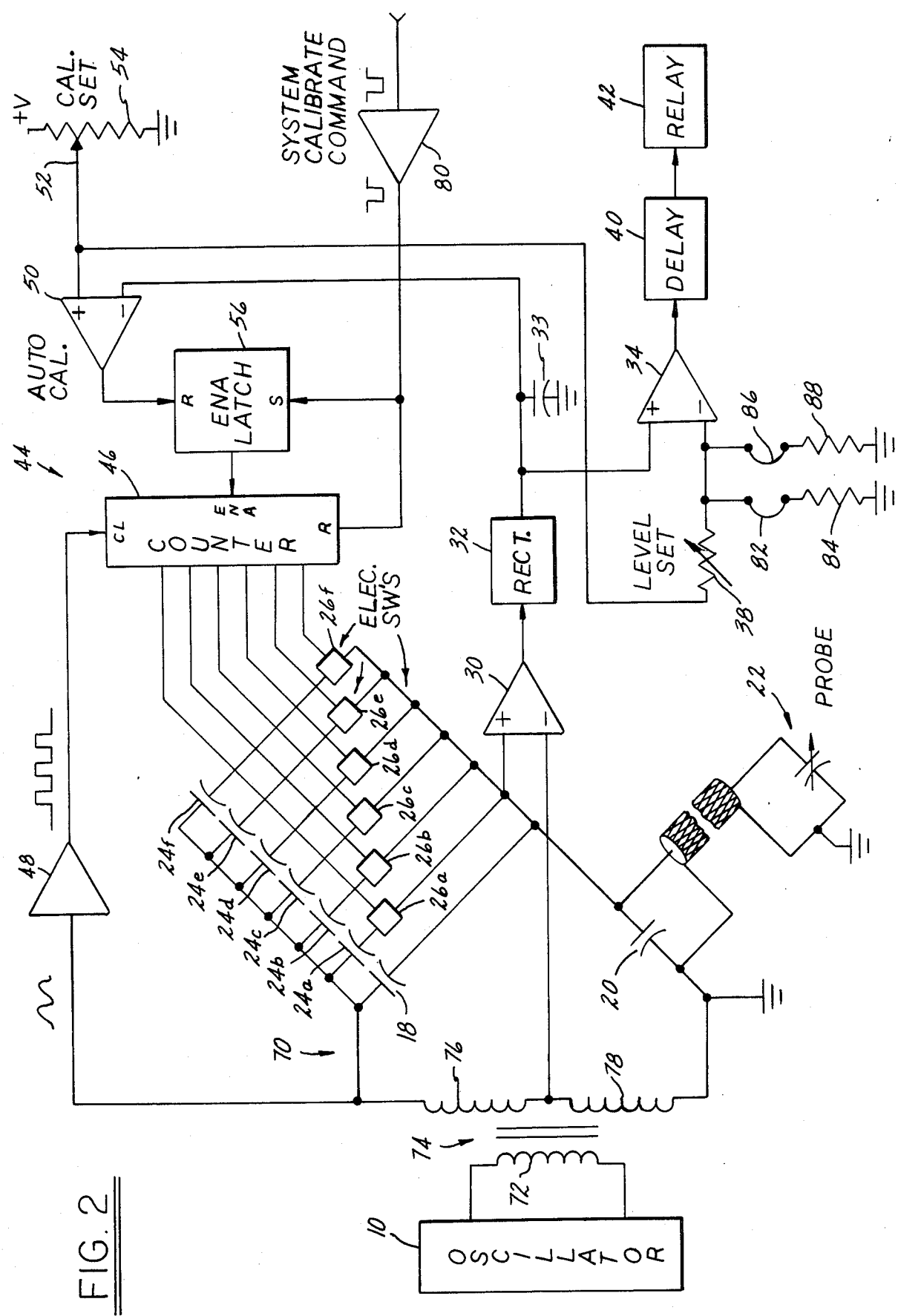

The invention, together with additional objects, features and advantages thereof, will be best understood from the following description, the appended claims and the accompanying drawings in which:

FIG. 1 is a partially schematic and partially functional block diagram of a presently preferred embodiment of a capacitance-type material level control system in accordance with the invention; and FIG. 2 is a partially schematic and partially functional block diagram of another embodiment of the invention featuring various modifications to the preferred embodiment of FIG. 1.

The disclosure of above-noted U.S. application Ser. No. 411,527 filed Aug. 25, 1982 and entitled "Capacitance-Type Material Level Indicator" and now U.S. Pat. No. 499,766, is incorporated herein by reference.

FIG. 1 illustrates a presently preferred embodiment of a material level indicating system of the invention as comprising an rf oscillator 10 which provides a periodic, preferably sinusoidal, output signal. A capacitance bridge 12 includes a first pair of fixed capacitors 14,16 connected in series across the output of oscillator 10, and a second pair of fixed capacitors 18,20 likewise connected in series across the output of oscillator 10 and thus in parallel with series-connected capacitors 14,16. A capacitance-type material level probe 22 is connected by a shielded cable or the like across capacitor 20 in bridge 12. Probe 22 may be of any suitable type adapted to be mounted in a storage vessel so as to be responsive to variations in capacitance as a function of material level. The probe assembly illustrated in the U.S. application of Fleckenstein, Ser. No. 419,776 filed Sept. 20, 1982, now U.S. Pat. No. 4,499,641 and assigned to the assignee hereof, is presently preferred. However, as will be recognized by persons skilled in the art, the principles of the present invention may be applied equally as well to other types of capacitance probes.

A plurality of fixed capacitors 24a-24f are each individually connected in series with one of a corresponding plurality of controlled electronic switches 26a-26f across capacitor 18 in bridge circuit 12. Thus, the capacitances of capacitors 24a-24f are selectively additive to the capacitance of capacitor 18 as a function of the conductive conditions of switches 26a-26f. A differential amplifier 30 has a first input connected to the junction of bridge capacitors 14,16 and a second input connected to the junction of bridge capacitors 18,20, and thus provides an output indicative of the balance condition of capacitance bridge 12. That is, the output of amplifier 30 is a periodic signal having an amplitude which varies as a function of the voltage differential between its inputs, which in turn varies with bridge unbalance. The output of amplifier 30 is connected through a rectifier 32 to a capacitor 33 to provide a dc indication of bridge balance condition. The output of rectifier 32 is connected to one input of a comparator 34 which receives a reference input from the wiper 36 of an adjustable resistor 38. The output of comparator 34 is connected through a delay circuit 40 to a relay 42, which may be an electromagnetic or solid state relay for indicating that the level of material in the storage vessel has reached a level corresponding to the adjusted position of wiper 36 at resistor 38.

Automatic calibration circuitry 44 in accordance with the present invention includes a digital counter 46 having a plurality of binary outputs individually connected to corresponding control inputs of electronic switches 26a-26f. An amplifier 48, which may comprise a peak or zero-crossing detector for example, receives an input from rf oscillator 10 and provides a pulsed output to the clock input of counter 46. A comparator 50 receives a reference input from the wiper 52 of an adjustable resistor 54 and a signal input from the output of rectifier 32. The output of comparator 50 is connected to the reset input of a calibration-enable latch 56. The output of latch 56 is connected to the enable input of counter 46. An operator pushbutton 58 is connected through a one-shot 60 to the set input of latch 56 and to the reset input of counter 46.

In general, automatic calibration circuitry 44 cooperates with capacitance bridge 12 during a calibration mode of operation initiated by operator pushbutton 58 to establish, in effect, a reference capacitance level, and thus a reference balance condition of bridge 12 indicative of a preselected material condition in the vessel which exists during the calibration operation. Preferably, the level of material in the vessel is first raised (by means not shown) to the level or probe 22, and then lowered so as to be spaced from the probe. If the material is of a type which coats the probe, such coating will remain on the probe and be taken into consideration during the ensuing calibration operation with material level lowered.

In operation, pushbutton 50 is depressed by an operator to reset counter 46 and to set latch 56, thereby initiating a calibration mode of operation. With counter 46 thus enabled by latch 56, the counter is incremented by clock pulses from amplifier 48. The binary outputs of counter 46 thus selectively connect and disconnect the capacitors 24a–24f in bridge circuit 12 so as to vary the balance condition of the bridge circuit independently of material probe 22. When the sum of capacitor 18 and the capacitors 24a–24f which are connected into the bridge circuit are such that the balance condition thereof reaches the calibration reference level set by resistor 54, latch 56 is reset by comparator 50 and counter 46 is disenabled. The calibration count is stored in counter 46, and capacitors 24a–24f remain connected or disconnected as established during the calibration operation so as to establish, in effect, a capacitance reference level corresponding to the setting of resistor 54.

Thereafter, during normal operation, as the level of material in the vessel varies, such variation is detected by probe 22. When the material rises, and the effective capacitance of probe 22 likewise rises to the level set by resistor 38, comparator 34 activates relay 42. Delay 40, which may be adjustable, is provided so that transient conditions do not result in an erroneous indication of change of material level. Resistors 54,38 may be preset in the factory or in the field as a function of the material to be sensed, and of the resulting expected corresponding difference between the low-level calibration setting of resistor 54 and the higher-level setting of resistor 38.

In accordance with a preferred feature of the invention, the capacitance values of capacitors 24a–24f are selected such that the effective capacitance added in parallel with capacitor 18 into bridge circuit 12 by each capacitor 24a–24f corresponds to the numerical significance of the corresponding counter output. That is, the values of capacitors 24a and 24b are selected such that the effective capacitance connected in parallel with fixed capacitor 18 is twice as much when switch 26b only is closed as when switch 26a only is closed (assuming that switch 26a is connected to the least significant output bit and switches 26b–26f are connected in increasing order of significance). Likewise, the effective capacitance added by switch 26f and capacitor 24f is thirty-two times the effective value of capacitor 24a and switch 26a. It will be appreciated that the number of capacitor/switch pairs illustrated in FIG. 1 is exemplary and may be increased or decreased as required for any given application.

FIG. 2 illustrates a number of modifications to the preferred embodiment of FIG. 1. Elements which are identical in FIGS. 1 and 2 are indicated by correspondingly identical reference numerals. Only the differences between the embodiments of FIGS. 1 and 2 will be discussed. In the embodiment of FIG. 2, the capacitance bridge circuit 12 of FIG. 1 is replaced by an inductance/capacitance bridge circuit 70. More specifically, the output of rf oscillator 10 is connected to the primary winding 72 of a transformer 74 which has secondary windings 76,78 connected in series as adjacent arms of bridge circuit 70 (in place of capacitors 14,16 in bridge circuit 12 of FIG. 1). One input of differential amplifier 30 is connected to the junction of secondary windings 76,78. The remaining structure and operation of bridge circuit 70 are substantially similar to those of bridge 12 in FIG. 1 hereinabove discussed in detail.

FIG. 2 illustrates a further modification wherein a buffer amplifier 80 has an input connected to receive a calibrate command signal from a remote system or the like (not shown), and an output connected to the set input of latch 56 and the reset input of counter 46 to initiate a calibration mode of operation. With this modification, the calibration mode of operation may be initiated periodically by the remote system without operator intervention. Of course, operator responsive switch 58 and one-shot 60 (FIG. 1) may be provided in parallel with buffer amplifier 80 in FIG. 2, so that the calibration mode of operation may be initiated either manually or automatically.

In accordance with a third modification illustrated in FIG. 2, the reference input of level-detecting comparator 34 is connected through the adjustable level-set resistor 38 to the wiper 52 of the calibration-set resistor 54. This modification more closely ties the setting of the level reference to comparator 34 to the calibration reference of resistor 54, so that the level-indicating differential between comparator 34 and comparator 50 will remain substantially constant during operation regardless of temperature variations of resistor 54. The reference input of comparator 34 is also connected through the jumper 82 and the resistor 84 to ground, and through the jumper 86 and the resistor 88 to ground. Jumpers 82,86 may be selectively left intact or removed in order to adjust the calibration/operation differential for a particular material capacitance. For a material of low dielectric constant such as cement, jumpers 82,86 may be removed and a threshold differential corresponding to a capacitance of four picofarads, for example, may be established by resistor 38. For a material of medium dielectric constant such as acetone, jumper 82 may be left intact and jumper 86 removed to establish a higher capacitance differential of eight picofarads, for example, corresponding to the same high material level. A still higher capacitance differential may be established for a material of high dielectric constant such as glycerine by leaving both jumpers 82,86 intact for a maximum capacitance differential of twenty picofarads, for example.

The invention claimed is:

1. A system for indicating level of material in a vessel as a function of material capacitance comprising: a source of rf power; bridge circuit means including first and second pairs of impedance means respectively connected in series across said source to form paired adjacent arms of said bridge circuit means, said second pair of impedance means including a capacitance probe adapted to be disposed in a vessel so as to be responsive to variations in capacitance as a function of material level and variable impedance means connected in series with said capacitance probe across said source; means connected across said bridge circuit means between the junction of said first pair of impedance means and the junction of said second pair of impedance means for indicating a balance condition of said bridge circuit means as a function of a voltage difference between said junctions; calibration circuit means including means for initiating a calibration mode of operation, means responsive to said initiating means and to said balance indicating means for automatically varying the impedance of said variable impedance means in said bridge circuit means independently of said capacitance probe during said calibration mode of operation, and means responsive to said balance indicating means during said calibration mode of operation for detecting said balance condition at said bridge circuit means, corresponding to a predetermined material level condition at said vessel, and for terminating said calibration mode of operation when said balance condition is obtained; and means coupled to said balance indicating means and responsive to variation said in balance condition at said bridge circuit means including said capacitance probe from said balance condition for indicating level of material in said vessel.

2. The system set forth in claim 1 wherein said variable impedance means comprises variable capacitance means.

3. The system set forth in claim 2 wherein said variable capacitance means comprises a plurality of capacitors and a corresponding plurality of electronic switch means respectively connected in series with said capacitors and responsive to said automatically varying means for selectively connecting said capacitors into said bridge circuit means.

4. The system set forth in claim 3 wherein said first pair of impedance means comprises first and second fixed capacitance impedance means.

5. The system set forth in claim 3 wherein said first pair of impedance means comprises first and second inductive impedance means.

6. A system for indicating level of material in a vessel as a function of material capacitance comprising a source of rf power; capacitance bridge circuit means comprising first and second pairs of capacitance impedance means respectively connected in series across said source, said second pair of capacitance impedance means including a capacitance probe adapted to be disposed in a vessel so as to be responsive to variations in capacitance at said vessel as a function of material level and variable capacitance means connected in series with said capacitance probe across said source, said variable capacitance means comprising a plurality of capacitors and switch means for selectively connecting each of plurality of capacitors in parallel with each other in said bridge circuit means; balance condition detection means having a first input connected between said variable capacitance means and said probe and a second input connected between said first pair of capacitance impedance means, said balance condition detection means being responsive to voltage across said first and second inputs for indicating a balance condition at said capacitance bridge circuit means; automatic calibration means including means for initiating a calibration operation, counter means having outputs operatively connected selectively to control conductive condition of said switch means, means responsive to said initiating means and to said balance condition detection means for automatically varying the count in said counter means during said calibration operation, and means responsive to said balance condition detection means for terminating operation of said counter means when said balance condition detection means indicates said balance condition at said bridge circuit means; and means coupled to said balance condition detection means for indicating level of material in said vessel as a function of variation in said balance condition at said bridge circuit means from said predetermined balance condition.

7. A system for indicating a condition of material as a function of material capacitance, said system comprising a source of rf power having first, second and third outputs, said source generating a first amplitude rf voltage between said first and second outputs and a second amplitude rf voltage greater than said first amplitude rf voltage between said first and third outputs; a capacitance probe adapted to indicate material condition as a function of material capacitance; variable capacitance means including a plurality of capacitors and a plurality of electronic switch means for selectively connecting respective ones of said capacitors in series with said capacitance probe between said first and third outputs; means having a first input connected to said second output and a second input connected between said capacitance probe and said variable capacitance means, and providing an output indicative of a voltage difference between said inputs; and automatic calibration means including means for initiating a calibration operation, a counter having a plurality of outputs operatively connected to selectively control conductive condition of said electronic switch means, means responsive to said initiating means for enabling operation of said counter, means for varying the count in said counter when said counter is enabled, and means responsive to said voltage difference for terminating operation of said counter when said voltage difference indicates a predetermined material condition.

* * * * *